United States Patent
Guenther et al.

(10) Patent No.: US 6,338,244 B1
(45) Date of Patent: Jan. 15, 2002

(54) EXHAUST GAS PURIFICATION PROCESS AND APPARATUS WITH INTERNAL GENERATION OF AMMONIA FOR REDUCING NITROGEN OXIDE

(75) Inventors: Josef Guenther, Affalterbach; Brititte Konrad, Blaustein; Bernd Krutzsch, Denkendorf; Arno Nolte, Stuttgart; Dirk Voigtlaender, Korntal-Muenchingen; Michel Weibel, Stuttgart; Marko Weirich, Stuttgart; Guenter Wenninger, Stuttgart, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/520,013

(22) Filed: Mar. 6, 2000

(30) Foreign Application Priority Data

Mar. 6, 1999 (DE) ........................ 199 09 933

(51) Int. Cl.⁷ ............................... F01N 3/00
(52) U.S. Cl. ............................ 60/285; 60/287; 60/288; 60/301
(58) Field of Search ..................... 60/285, 286, 287, 60/288, 301

(56) References Cited

U.S. PATENT DOCUMENTS

| | | | |
|---|---|---|---|
| 3,767,764 A | | 10/1973 | Dolbear .................. 423/213.2 |
| 5,657,625 A | * | 8/1997 | Koga et al. ..................... 60/285 |
| 5,727,385 A | * | 3/1998 | Hepburn ........................ 60/297 |
| 5,974,793 A | * | 11/1999 | Kinugasa et al. ............. 60/285 |
| 6,019,024 A | * | 11/1999 | Kinugasa et al. ............. 60/285 |
| 6,014,859 A | * | 1/2000 | Yoshizaki et al. ............ 60/285 |
| 6,047,542 A | * | 4/2000 | Kinugasa et al. ............. 60/276 |
| 6,119,452 A | * | 9/2000 | Kinugasa et al. ............. 60/285 |

FOREIGN PATENT DOCUMENTS

| | | |
|---|---|---|
| EP | 0 796 983 | 9/1997 |
| EP | 0 802 315 | 10/1997 |
| JP | 4-365920 | 12/1992 |
| JP | CPI 93-040651/06 | 12/1992 |
| JP | 8004522 | * 1/1996 |
| JP | 9004441 | * 1/1997 |
| WO | WO 97/17532 | 5/1997 |

* cited by examiner

Primary Examiner—Thomas Denion
Assistant Examiner—Diem Tran
(74) Attorney, Agent, or Firm—Crowell & Moring LLP

(57) ABSTRACT

A method and apparatus for purifying an exhaust gas of an internal combustion engine includes an ammonia generating catalyst for generating ammonia from nitrogen oxides contained in the exhaust gas to be purified, and a nitrogen oxide reducing catalyst downstream of the ammonia generating catalyst, for reduction of nitrogen oxides contained in the exhaust gas to be purified. Generated ammonia is used as the reducing agent. A nitrogen oxide adsorption catalyst is arranged upstream of the ammonia generating catalyst, or the ammonia generating catalyst is arranged in an exhaust pipe branch which pertains to only a part of several separately controllable internal-combustion sources. One or more additional exhaust pipe branches assigned to the other internal-combustion sources and lead to the nitrogen oxide reducing catalyst, while bypassing the ammonia generating catalyst. The part of the internal-combustion sources pertaining to the exhaust pipe branch of which contains the ammonia generating catalyst is operated either continuously or intermittently in a rich mode. Also, one or more combustion sources which feed their exhaust gas to the nitrogen oxide adsorption catalyst may be operated alternately in a lean and rich mode.

5 Claims, 1 Drawing Sheet

EXHAUST GAS PURIFICATION PROCESS AND APPARATUS WITH INTERNAL GENERATION OF AMMONIA FOR REDUCING NITROGEN OXIDE

BACKGROUND AND SUMMARY OF THE INVENTION

This application claims the priority of German patent document 199 09 933.2, filed Mar. 6, 1999, the disclosure of which is expressly incorporated by reference herein.

The invention relates to a method and apparatus for exhaust gas purification, which provides an ammonia generating catalyst for generating ammonia from nitrogen oxides contained in the exhaust gas to be purified, and which includes a nitrogen oxide reducing catalyst arranged downstream of the ammonia generating catalyst for reducing the nitrogen oxides contained in the exhaust gas to be purified, using the generated ammonia as the reducing agent.

Exhaust gas purification systems and operating methods of this type are described in International Published Patent Application WO 97/17532 A1, and are used particularly for purifying the exhaust gas of a preferably multi-cylinder motor vehicle internal-combustion engine. The exhaust gas of each cylinder is fed via a short exhaust gas connection to a common exhaust pipe in which all exhaust-gas-purifying components are situated.

In one of the embodiments disclosed there, a three-way ammonia generating catalyst, a nitrogen oxide adsorption catalyst which simultaneously operates as a nitrogen oxide reducing catalyst, and an ammonia conversion catalyst are connected sequentially in the exhaust gas flow direction. The engine is operated in a time-alternating manner, with a rich (high-fuel) and a lean (low-fuel) mixture of fuel and air. In the lean operating phases, the nitrogen oxides are intermediately stored in the nitrogen oxide adsorption catalyst. In the rich operating phases, ammonia is generated by the ammonia generating catalyst from the nitrogen oxides contained in the exhaust gas; the generated ammonia then causes a nitrogen oxide reduction in the nitrogen oxide adsorption catalyst, which follows, with the desorption of the nitrogen oxides previously adsorbed there. Any excess ammonia is reduced in the ammonia conversion catalyst which follows.

In a further embodiment, instead of the nitrogen oxide adsorption catalyst, an ammonia adsorption catalyst is provided which simultaneously operates as a nitrogen oxide reduction catalyst. In the rich operating phases, the ammonia generated by the ammonia generating catalyst is intermediately stored in the ammonia adsorption catalyst. In the lean operating phases, the nitrogen oxides contained in the exhaust gas are reduced while the ammonia is desorbed in the ammonia adsorption catalyst.

It still another embodiment, the nitrogen oxide adsorption catalyst and the ammonia adsorption catalyst are serially situated between the ammonia generating catalyst and the ammonia conversion catalyst. In the lean operating phases, the nitrogen oxides contained in the exhaust gas are intermediately stored in the nitrogen oxide adsorption catalyst. Nitrogen oxides which may not have been adsorbed there are reduced in the subsequent ammonia adsorption catalyst, with the desorption of ammonia. In the rich operating phases, the ammonia generating catalyst generates ammonia from the nitrogen oxides contained in the exhaust gas; this ammonia causes a desorption and reduction of intermediately stored nitrogen oxides in the subsequent nitrogen oxide adsorption catalyst. In all implementations, it is endeavored for reasons of fuel consumption, to enable the engine to drive as long as possible in the lean operation.

One object of the present invention is to provide a method and apparatus for exhaust gas purification of the type described above, by means of which nitrogen oxides contained in the exhaust gas can be converted as effectively as possible by internally generated ammonia.

Another object of the invention is to provide such a purification method and apparatus in which the one or several combustion sources generating the exhaust gas to be cleaned can be operated with a fuel consumption which is as low as possible.

These and other objects and advantages are achieved by the exhaust gas purification system according to the invention, which is suitable specifically for purifying the exhaust gas of at least two separately controllable groups of one or more internal-combustion sources (e.g., engine cylinders). A separate exhaust pipe branch arranged parallel to one (or the other) exhaust pipe branch(es) of the other groups is assigned to at least a first group; and all exhaust pipe branches jointly lead to the nitrogen oxide reducing catalyst. An ammonia generating catalyst is characteristically arranged in the exhaust pipe branch which is part of the first group of combustion sources, and is therefore acted upon only by the partial exhaust gas flow of this group of combustion sources. The other internal-combustion sources can therefore be operated independently of the requirements of the ammonia generating catalyst. On the other hand, the operation of the group of combustion sources pertaining to the ammonia generating catalyst can be adapted specifically to meet its requirements.

In one embodiment of the invention, in addition to the ammonia generating and nitrogen oxide reducing catalysts, the exhaust gas purification system has a nitrogen oxide adsorption catalyst which is characteristically arranged upstream of the ammonia generating catalyst. As a result, nitrogen oxides which are increased in the exhaust gas in lean operating phases of the combustion sources can be intermediately stored in the nitrogen oxide adsorption catalyst, and can be desorbed in a respective subsequent rich operating phase and, in the ammonia generating catalyst, which follows, can be utilized at least partially for generating ammonia.

Another embodiment of the invention combines the above measures in that a nitrogen oxide adsorption catalyst and an ammonia generating catalyst are connected in sequence in an exhaust pipe branch, which is part of one of several groups of combustion sources. The latter exhaust pipe branch, together with one or more exhaust pipe branches pertaining to the other combustion sources, leads to nitrogen oxide reducing catalyst.

In another embodiment, the group of combustion sources, whose partial exhaust gas flow acts upon the ammonia generating catalyst (and optionally the nitrogen oxide adsorber catalyst connected on the input side) is operated continuously or at least at times in the rich operation. This ensures the formation of a sufficient amount of ammonia in order to be able to reduce also the nitrogen oxides contained in the exhaust gas of the other internal-combustion sources in the nitrogen oxide reducing catalyst which follows, while utilizing the ammonia as a reducing agent.

In still another embodiment of the invention, the one or more other combustion sources, whose exhaust gas bypasses the ammonia generating catalyst, are continuously operated in the lean operation mode in order to keep the fuel consumption as a whole as low as possible.

According to yet another embodiment of the invention, the one or more combustion sources, whose exhaust gas acts upon the nitrogen oxide adsorption catalysts, are periodically operated alternately in the lean and rich regions. In this case, the individual operating phases can be controlled such that, on the one hand, the fuel consumption remains as low as possible and, on the other hand, sufficient ammonia is always provided as a reducing agent for reduction of nitrogen oxide.

Other objects, advantages and novel features of the present invention will become apparent from the following detailed description of the invention when considered in conjunction with the accompanying drawings.

DETAILED DESCRIPTION OF THE DRAWINGS

Figure 1:
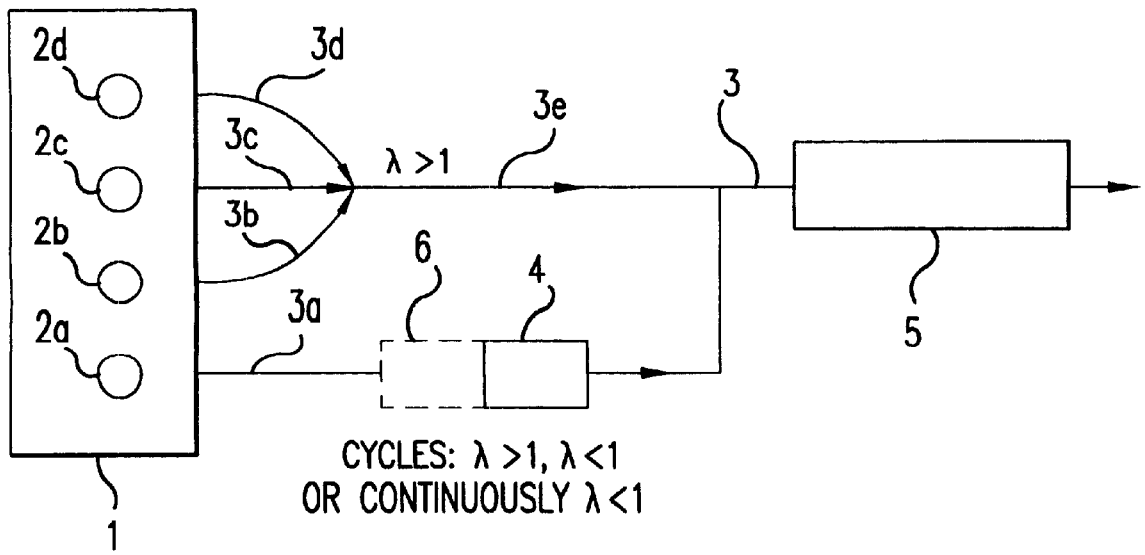
FIG. 1 is a schematic block diagram of a multi-cylinder internal-combustion engine with a pertaining exhaust gas purification system with partial-exhaust-gas-flow-type generation of ammonia.

The internal-combustion engine 1 illustrated in FIG. 1 may specifically be an internal-combustion engine of a motor vehicle which can be operated in the lean region and has, for example, four cylinders (and thus combustion spaces 2a to 2d) as the internal-combustion sources. A separate exhaust pipe branch 3a to 3d is provided for each combustion space 2a to 2d, with an ammonia generating catalyst 4 situated in a first exhaust gas pipe branch 3a which is assigned to a first combustion space 2a. The three other exhaust pipe branches 3b, 3c, 3d, on the other hand, combine after a short length to form a common exhaust pipe branch 3e which, in turn, is combined with the first exhaust pipe branch 3a to form a common exhaust pipe section 3. A nitrogen oxide reducing catalyst 5 is arranged in the common exhaust pipe section 3.

The exhaust gas flow direction is symbolized by respective arrows. Optionally, in the first exhaust pipe branch 3a, a nitrogen oxide adsorption catalyst 6 illustrated by a broken line is provided, specifically upstream of the ammonia generating catalyst 4. Suitable constructions and catalyst materials are known to the person skilled in the art, and require no further explanation. In particular, the ammonia generating catalyst 4 can be formed by a three-way catalyst or another suitable catalyst which favors the reaction

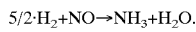
$5/2 \cdot H_2 + NO \rightarrow NH_3 + H_2O.$

BY means of this reaction, ammonia is synthesized internally from nitrogen oxides and hydrogen contained in the exhaust gas.

The described construction has the result that the ammonia generating catalyst 4 and the nitrogen oxide adsorption catalyst 6 connected on the input side are acted upon only by the exhaust gas of the first combustion space 2a by way of the first exhaust pipe branch 3a. The exhaust gas of the other combustion spaces 2b, 2c, 2d bypasses these two catalysts 4, 6 by way of the other exhaust pipe branches 3b, 3c, 3d, and reaches the nitrogen oxide reducing catalyst 5 directly. As a result of the separate controllability of the combustion spaces 2a to 2d, specifically of the first combustion space 2a, on the one hand, and the other combustion spaces 2b, 2c, 2d, on the other hand, the exhaust gas purification system can advantageously be operated as follows.

The first cylinder or combustion space 2a of the engine is alternated periodically between operation in lean and rich modes (that is, alternately with a fuel/air ratio λ above or below the stoichiometric value of one). In the lean operating phases, in which the fuel consumption is relatively low, nitrogen oxides increasingly occur in the exhaust gas of this combustion space 2a, and are intermediately stored in the nitrogen oxide adsorption catalyst 6. In the rich operating phases, the nitrogen oxides intermediately stored there are desorbed and reach the ammonia generating catalyst 4 connected on the output side which utilizes them together with hydrogen contained in the exhaust gas of the rich-operated first combustion space 2a to generate ammonia. The generated ammonia will then be available in the subsequent nitrogen oxide reducing catalyst 5 as a reducing agent for the reduction of the nitrogen oxides contained particularly in the exhaust gas of the three other combustion spaces 2b, 2c, 2d.

Generally, the amount of ammonia obtained from the partial exhaust gas flow of the first combustion space 2a is sufficient for completely reducing all nitrogen oxides there which reach the nitrogen oxide reducing catalyst 5, even if the three other combustion spaces 2b, 2c, 2d are continuously operated in the lean mode (that is, with λ>1). The continuous lean operation of the three other combustion spaces 2b, 2c, 2d is therefore preferred for the purpose of minimizing the fuel consumption. As an alternative, a temporary rich operation of the three other combustion spaces 2b, 2c, 2d may be provided.

As an alternative to the alternating rich and lean operation, the first combustion space 2a can continuously be operated in the rich mode, particularly when the optional nitrogen oxide adsorption catalyst 6 is not provided. In each case, the ammonia generating catalyst 4 during the rich operation of the pertaining combustion space 2a favors the ammonia synthesis reaction $5/2 \cdot H_2 + NO \rightarrow NH_3 + H_2O$ of the nitrogen oxides contained in the rich exhaust gas and the hydrogen increased in the rich exhaust gas.

It is understood that modifications of the above-described exhaust gas purification system and of the explained operating processes therefore are conceivable. Thus, the invention is suitable not only for lean-operated Otto or diesel engines of motor vehicles, but for other internal-combustion sources whose exhaust gas is to be purified of contained nitrogen oxides. Instead of the illustrated division of four internal-combustion sources (combustion spaces 2a to 2d) into one internal-combustion source assigned to the ammonia generating catalyst 4, on the one hand, and the other three internal-combustion sources, on the other hand (whose exhaust gas, while bypassing the ammonia generating catalyst 4, is guided directly to the nitrogen oxide reducing catalyst 5), any other division into a group of one or several internal-combustion sources, whose exhaust gas is guided by way of a pertaining exhaust gas pipe branch to the ammonia generating catalyst, and one or several other groups of one or several additional internal-combustion sources is conceivable, whose exhaust gas bypasses the ammonia generating catalyst.

As another alternative, it may be provided to guide the exhaust gas of all internal-combustion sources by way of a common exhaust pipe, with the ammonia generating catalyst and the nitrogen oxide reducing catalyst connected on the output side.

Also, the nitrogen oxide adsorption catalyst may be connected on the input side of the ammonia generating catalyst. Also in this case, part of the internal-combustion sources are temporarily or continuously operated in a rich mode in order to ensure a sufficient internal generating of ammonia in the ammonia generating catalyst.

Figure 2:
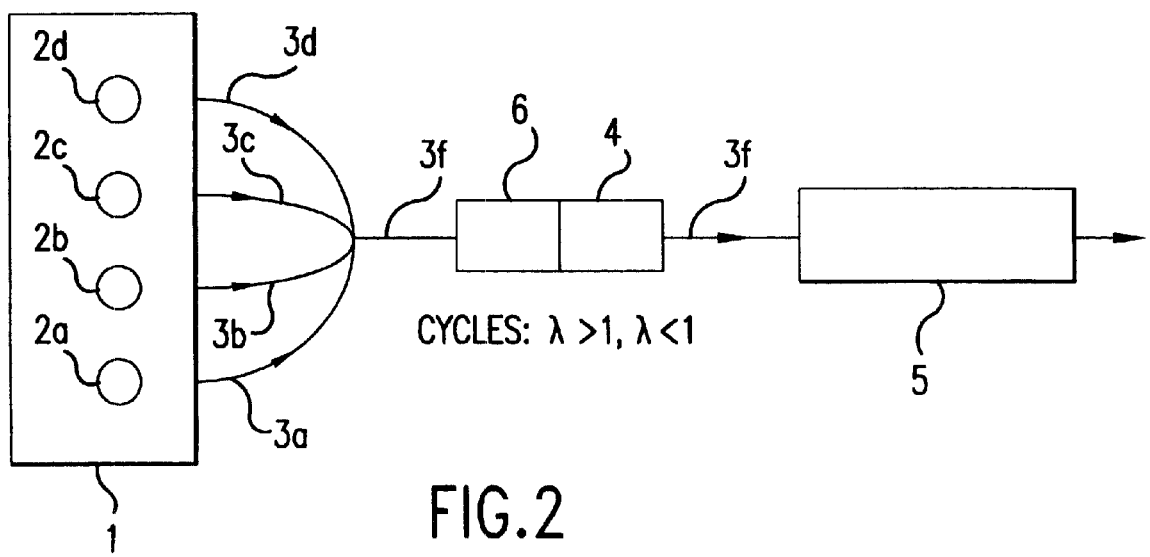
FIG. 2 is a block diagram corresponding to FIG. 1, but for an embodiment with a total-exhaust-gas-flow-type generating of ammonia.

Such a system is illustrated in FIG. 2, in which case, for reasons of simplicity, components which are functionally identical to those of the system of FIG. 1 are provided with the same reference numbers, so that, to this extent, reference can be made to the above description concerning FIG. 1. As the only significant difference with respect to the system of FIG. 1, in the case of the system of FIG. 2, all four exhaust pipe branches 3a to 3d lead into a common exhaust pipe 3f in which the nitrogen oxide adsorption catalyst 6, the ammonia generating catalyst 4 and the nitrogen oxide reducing catalyst 5 are serially connected behind one another.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An exhaust gas purification system for purifying the exhaust gas of several separately controllable internal-combustion sources, comprising:

an ammonia generating catalyst for generating ammonia from nitrogen oxides contained in the exhaust gas to be purified;

a nitrogen oxide adsorption catalyst for intermediate storage of nitrogen oxides contained in the exhaust gas to be purified; and a nitrogen oxide reducing catalyst arranged downstream of the ammonia generating catalyst, for reducing nitrogen oxides contained in the exhaust gas to be purified, while using the ammonia as the reducing agent which is generated in the ammonia generating catalyst, wherein the ammonia generating catalyst is arranged in an exhaust pipe branch pertaining to a first part of the internal-combustion sources and the nitrogen oxide adsorption catalyst is arranged upstream of the ammonia generating catalyst, which exhaust pipe branch leads to the nitrogen oxide reducing catalyst, and wherein at least one additional exhaust pipe branch is assigned to the other internal-combustion sources and leads to the nitrogen oxide reducing catalyst, while bypassing the ammonia generating catalyst and the nitrogen oxide adsorption catalyst.

2. A process for operating an exhaust gas purification system according to claim 1, wherein the first part of the internal-combustion sources pertaining to the exhaust pipe branch of the ammonia generating catalyst is operated continuously or temporarily by a rich fuel/air mixture.

3. The process according to claim 2, wherein the internal-combustion sources which are not part of the exhaust pipe branch of the ammonia generating catalyst, are continuously operated by a lean fuel/air mixture.

4. A process for operating an exhaust gas purification system according to claim 1, wherein the internal-combustion sources associated with the exhaust pipe branch that contains the nitrogen oxide adsorption catalyst is operated in successive time intervals alternately by a rich and a lean fuel/air mixture, the nitrogen oxide adsorption catalyst in the lean operating phases adsorbing nitrogen oxides contained in the fed exhaust gas, while, in the rich operating phases, the nitrogen oxides intermediately stored there are desorbed and are at least partially utilized in the ammonia generating catalyst connected on the output side for generating ammonia.

5. A process for operating an exhaust gas purification system, comprising:

operating a first exhaust pipe branch containing a nitrogen oxide adsorption catalyst and a downstream ammonia generating catalyst alternately in a rich operating phase and a lean operating phase, wherein the first exhaust pipe branch leads to a nitrogen oxide reducing catalyst;

adsorbing nitrogen oxides contained in the exhaust gas by the nitrogen oxide adsorption catalyst in the lean operating phase;

desorbing the nitrogen oxides from the nitrogen oxide adsorption catalyst in the rich operating phase;

generating ammonia from the desorbed nitrogen oxides by the ammonia generating catalyst;

reducing nitrogen oxides by the nitrogen oxide reducing catalyst arranged downstream from the ammonia generating catalyst with the ammonia as a reducing agent; and operating at least one additional exhaust pipe branch continuously in a lean operating phase that leads to the nitrogen oxide reducing catalyst while bypassing the nitrogen oxide adsorption catalyst and the ammonia generating catalyst in the first exhaust pipe branch.

* * * * *